United States Patent Office 3,046,138
Patented July 24, 1962

3,046,138
STABILITY OF WHISKEY
John W. Eck, Peekskill, N.Y., and Richard R. Sucietto, Cincinnati, Ohio, assignors to National Distillers and Chemical Corporation, New York, N.Y., a corporation of Virginia
No Drawing. Filed Dec. 5, 1958, Ser. No. 778,333
8 Claims. (Cl. 99—48)

The present invention relates to a novel method of stabilizing distilled alcoholic liquors. More particularly, this invention pertains to a method of clarifying whiskeys and other distilled alcoholic liquors which have been aged in wooden containers or barrels.

Distillers have always had trouble with whiskeys becoming hazy, a condition which comes about during storage or shipping and which is aggravated by low temperatures, i.e., about 38° F. or below. Although the exact nature of these haze-producing constituents is not known, it is believed that they are, to a large extent, fatty materials and lignins. These fatty materials are thought to come from the grain, carry through into the high wines, and end up in the whiskey barrel; the lignins possibly are extracted from the wooden container or barrel during the aging process. To combat this clouding of their whiskeys, distillers have had to resort to treating the whiskey with carbon or to chilling the whiskey to obtain the adsorption or floc precipitation of haze-producing constituents and other undesired substances. Heretofore the methods of treating aged distilled alcoholic liquors with activated carbon have involved the use, in addition to the carbon, of other techniques, such as cooling and/or supplementary material or materials, such as diatomaceous earth or cation and anion exchangers.

It is one object of this invention to provide a direct and simplified process for the removal of undesired materials from aged alcoholic liquors. Another object of this invention is to provide a process which avoids the multi-treatment methods prevalent in the prior art. Other objects will become apparent from the ensuing description of the invention.

A simple, fast, inexpensive means of stabilizing liquors, such as Bourbon or rye whiskeys, in order to retain their clear appearance under all conditions, including low temperatures, has now been found. For the purpose of this invention a stable whiskey is defined as one which does not develop either floc or haze within 45 days at 38° F.

The present invention is based on the discovery that an aged alcoholic liquor may be clarified by treating it with a combination of materials which have selectively adsorbent properties. More specifically it has been discovered that a satisfactory means for removing the objectionable solid matter in an aged alcoholic liquor involves the use of two or more activated carbons having varied characteristics which shall later be described.

In practice of this invention, the aged alcoholic liquor to be stabilized is treated with a gas adsorbent type activated carbon and with a decolorizing type activated carbon. The liquor is treated with these carbons, either separately or with both carbons together, for a period of about 15 to 90 minutes, and preferably for about 30 to 60 minutes, at a temperature of about 20° to 30° C. The carbon is then separated from the system by any conventional means, such as by filtering under pressure. It will also be understood that conventional filter aids may be employed in effecting the foregoing separation.

The aged alcoholic liquor which may be clarified by the process of the present invention includes all of the distilled high alcohol content liquors of the whiskey and other types, such as Bourbon, rye, wheat, Scotch, brandy and the like, which have been aged in barrels or other containers as is commonly practiced in the distilling industry.

Commercial activated carbons which are employed as adsorbents are divided into four general groups: (1) decolorizing, (2) gas and vapor adsorbent, (3) metal adsorbent, and (4) medicinal carbons, according to their physical structure and properties. The applications of the activated carbons from each group are not ordinarily interchangeable, and there is no one activated carbon for all uses, optimum characteristics varying with each application. The proper combination of properties is required in an adsorbent for the most effective results. It is seldom possible to predict the behavior of an activated carbon when applied to a new process or a new product. Two carbons having equal adsorptive powers for one substance can be quite unlike for others, making difficult any attempt to establish a relation between chemical structure and adsorbability of a particular activated carbon. The activated carbons used in the practice of the present invention must be carefully selected in order that the color, flavor, and congeners not be removed from the whiskey being stabilized.

It has now been found that, although a whiskey may be clarified to some degree by the use of only one type of activated carbon, outstanding results are achieved when at least two different types of activated carbon are employed, either consecutively or as a mixture. Especially satisfactory results have been attained when one gas adsorbent type and one decolorizing type activated carbon are used. The term "gas adsorbent" indicates an activated carbon which is granular, mechanically strong, and relatively dense with very fine pore structure, and "decolorizing" indicates an activated carbon which is soft, finely pulverized, and highly porous. Examples of gas adsorbing type activated carbons are those offered under the trade names of Columbia PW and Pittsburgh B. These are finely divided carbons of which approximately 90 to 100 percent pass the 100 mesh sieve. Examples of decolorizing type activated carbons are those offered under the trade names Nuchars, Norits and Darcos. These also are finely divided carbons of which approximately 90 to 100 percent pass the 100 mesh sieve. For the purposes of this invention, it is preferred to employ finely divided decolorizing and gas adsorbing carbons.

The gas adsorbing type activated carbon in employed in an amount equivalent to at least about 0.0075 weight percent of the whiskey and preferably in an amount of about between 0.014 and 0.020 weight percent, though greater amounts may be utilized effectively. The decolorizing type activated carbon is also employed in an amount equivalent to at least about 0.0075 weight percent of the whiskey and preferably in an amount of about between 0.0075 and 0.014 weight percent. The total quantity of both types of activated carbon should be at least about 0.0150 weight percent of the whiskey though amounts up to 0.0600 weight percent or higher can also be employed.

The two-carbon treatment of the present invention may be accomplished separately or in combination. The procedure involves the treatment, preferably with agitation, of the whiskey with the activated carbons at about 20° to 30° C. for a period of about 15 to about 90 minutes, preferably for about between 30 and 60 minutes.

In order to further describe this invention, the following examples, 1 to 3 inclusive, are set forth solely for purposes of illustration.

Example 1

A 6-year old, 86 proof Bourbon whiskey (400 parts) was agitated for 30 minutes at about 25° C. with a mixture of a commercial gas adsorbent activated Columbia PW (0.073 part) and a commercial decolorizing activated carbon Nuchar C–190–N (0.036 part). The carbon was removed from the whiskey by pressure filtration, and the whiskey remained clear after 65 days at 38° F.

*Example 2*

A 6-year old, 86 proof Bourbon whiskey (400 parts) was agitated for 30 minutes at about 25° C. with a mixture of a commercial gas adsorebnt activated carbon Columbia PW (0.055 part) and a commercial decolorizing activated carbon Nuchar C–190–N (0.055 part). After the carbon was separated by filtration, the whiskey remained clear after 65 days at 38° F.

*Example 3*

A 6-year old, 86 proof Bourbon whiskey (400 parts) was agitated for 30 minutes at about 25° C. with a commercial gas adsorbent activated carbon Columbia PW (0.055 part) and for an additional 30 minutes with a commercial decolorizing activated carbon Nuchar C–190–N (0.055 part). The whiskey remained clear after 95 days at 38° F. following removal of the carbon by filtration.

The advantages of the use of both gas adsorbent and decolorizing activated carbons for treating the whiskey may be illustrated by the following examples in which only one type of activated carbon was used. It should be noted that in these comparative examples both of the whiskeys developed floc upon storage at 38° F., in 45 days with the gas adsorbent activated carbon and in 21 days with the decoloring activated carbon, whereas in Examples 1 through 3, in each of which both gas adsorbent and decolorizing activated carbons were used, the whiskeys were stabilized, i.e., they remained clear for at least 65 days at 38° F.

*Example 4*

A 6-year old, 86 proof Bourbon whiskey (400 parts) was agitated with 0.055 part of a commercial gas absorbent activated carbon Columbia PW for 30 minutes at about 25° C. An additional 0.055 part of the same activated carbon was added, and the agitation was continued for an additional 30 minutes. The whiskey developed floc after 45 days at 38° F. after separating the carbon therefrom by filtration.

*Example 5*

A 6-year old, 86 proof Boudbon whiskey (400 parts) was agitated with 0.11 part of a commercial decolorizing activated carbon Nuchar C–190–N for 30 minutes at about 25° C. The carbon was removed by filtration, and the whiskey developed floc after 21 days at 38° F.

Above are disclosed but a limited number of embodiments of the process of the invention herein presented. It is possible to produce still other embodiments without departing from the scope of the invention herein disclosed, and it will be understood, therefore, that the above examples are only illustrative of the inventive process.

What is claimed is:

1. A method of treating aged distilled alcoholic liquors which comprises contacting said liquor with a gas adsorbent activated carbon and with a decolorizing activated carbon, and separating said alcoholic liquors from said carbons.

2. The method of claim 1 wherein said liquor is a whiskey.

3. The method of claim 1 wherein said liquor is contacted with a mixture of a gas adsorbent activated carbon and a decolorizing activated carbon for about 15 to about 90 minutes at a temperature of about 20° to 30° C.

4. The method of claim 1 wherein said liquor is contacted with a mixture of gas adsorbent activated carbon and decolorizing activated carbon for about 30 minutes at a temperature of about 20° to 30° C.

5. A method of stabilizing aged whiskey which comprises contacting said whiskey with at least about 0.0150 weight percent, based on the whiskey, of a mixture of a gas adsorbent activated carbon and a decolorizing activated carbon at a temperature of about 20° to 30° C., and then separating said whiskey from said carbons.

6. The method of claim 5 wherein said whiskey is Bourbon.

7. The method of claim 5 wherein said mixture of carbons is employed in an amount of about 0.015 to 0.060 weight percent.

8. The method of claim 5 wherein said mixture of carbons contains about 0.014 to 0.020 weight percent gas adsorbent activated carbon and about 0.014 to 0.020 weight percent decolorizing activated carbon.

References Cited in the file of this patent

UNITED STATES PATENTS 2,141,798 Peterson _____ Dec. 27, 1938

FOREIGN PATENTS 500,081 Great Britain _____ Feb. 2, 1939
722,815 Great Britain _____ Feb. 2, 1955

OTHER REFERENCES

Industrial and Engineering Chemistry, February 1943, pp. 251 to 254, vol. 35, No. 2, article "Activated Carbon Treatment of Whiskey," by C. C. Williams et al.

Barnebey-Cheney Adsorbite—Activated Carbon, published by Barnebey-Cheney Co., Columbus, Ohio.